United States Patent [19]

Schaetzle

[11] Patent Number: 5,976,291
[45] Date of Patent: Nov. 2, 1999

[54] PROCESS FOR JOINING PLASTIC MOLDINGS

[75] Inventor: Michael Schaetzle, Walldorf, Germany

[73] Assignee: Henkel Teroson GmbH, Heidelberg, Germany

[21] Appl. No.: 08/809,009

[22] PCT Filed: Aug. 31, 1995

[86] PCT No.: PCT/EP95/03412

§ 371 Date: Mar. 7, 1997

§ 102(e) Date: Mar. 7, 1997

[87] PCT Pub. No.: WO96/07535

PCT Pub. Date: Mar. 14, 1996

[30] Foreign Application Priority Data

Sep. 9, 1994 [DE] Germany .............................. 44 32 271

[51] Int. Cl.⁶ .................................................. B29C 73/02
[52] U.S. Cl. ........................... 156/94; 29/402.09; 428/63
[58] Field of Search ........................ 156/94, 98; 52/514; 29/402.09, 402.11; 428/63

[56] References Cited

U.S. PATENT DOCUMENTS

| | | | |
|---|---|---|---|
| 3,700,517 | 10/1972 | Roach | 29/402.09 |
| 4,707,391 | 11/1987 | Hoffmann | 428/63 |
| 4,732,633 | 3/1988 | Pokorny | 156/94 |
| 4,743,468 | 5/1988 | Jiminez | 156/94 |
| 5,298,099 | 3/1994 | Hoffmann | 428/63 |
| 5,653,835 | 8/1997 | Glen | 156/98 |

FOREIGN PATENT DOCUMENTS

| | | | |
|---|---|---|---|
| 930 000 796 | 5/1995 | Belgium . | |
| 0 180 865 | 5/1986 | European Pat. Off. . | |
| 186 081 | 7/1986 | European Pat. Off. . | |
| 0 315 101 | 5/1989 | European Pat. Off. . | |
| 1397693 | 3/1965 | France | 156/94 |
| 2 321 386 | 3/1977 | France . | |
| 27 58 892 | 7/1979 | Germany . | |
| 973 397 | 11/1982 | U.S.S.R. . | |
| 533090 | 2/1941 | United Kingdom . | |
| 0683389 | 11/1952 | United Kingdom | 156/94 |

OTHER PUBLICATIONS

Webster's II New Riverside Dictionary, Houghton–Mifflin Co., (1984).

*Primary Examiner*—Daniel Stemmer
*Attorney, Agent, or Firm*—Ernest G. Szoke; Wayne C. Jaeschke; Martin G. Meder

[57] ABSTRACT

A Process for Joining Plastic Moldings Plastic moldings can be joined with one-component or two-component adhesives, the connecting joint being spanned by metal strips. The metal strips are at least partly embedded in the adhesive layer. This process is particularly suitable for repairing damaged plastic moldings, more particularly automobile parts, for example fenders. The moldings repaired by the process according to the invention are restored to their original performance properties, more particularly dimensional rigidity, impact strength and appearance. In the event of scrapping, the moldings thus repaired are fully recyclable by conventional methods.

6 Claims, No Drawings

PROCESS FOR JOINING PLASTIC MOLDINGS

FIELD OF THE INVENTION

This invention relates to a process for joining plastic moldings using a one-component or two-component adhesive, the connecting joint being spanned by metal strips and the metal strips being at least partly embedded in the adhesive layer. More particularly, the invention relates to a process for repairing damaged plastic moldings.

BACKGROUND OF THE INVENTION

In several branches of industry, above all in the automotive industry, metal moldings are being increasingly replaced by plastic moldings. Plastic moldings are used on the one hand to save waste and on the other hand to simplify production cycles. In the automotive industry, for example, tailgates of automobiles, wing sections and, in particular, fenders of plastic moldings are being used to increasing extent. These plastic moldings may consist of a number of different plastics or composites, including for example polyethylene, polypropylene, polycarbonate, acrylonitrile/butadiene/styrene terpolymers (ABS), polyamide, polyurethane, polyepoxides and polyesters (particularly in the form of sheet molding compounds (SMC) or bulk molding compounds (BMC)). In addition, so-called polymer blends, for example EPDM-modified polyethylenes and polypropylene materials, are often used.

These plastic moldings can be damaged in the operation of the machines, apparatus and, in particular, vehicles (automobiles) equipped with them. In particular, the fenders of automobiles are often damaged in wrecks.

Hitherto, the damaged moldings have generally been replaced by new parts and not repaired.

This approach has two major disadvantages so far as the consumer is concerned. On the one hand, it is far more expensive to replace the damaged plastic molding by a new part than to repair it by simple methods. On the other hand, the damaged plastic molding has to be disposed of. This hitherto necessary disposal of bulky and unwieldy parts is highly undesirable on environmental grounds, in addition to which the disposal costs contribute significantly towards increasing the repair costs.

Accordingly, there has been no shortage of attempts to develop processes for repairing damaged plastic moldings although they have all been found in practice to show serious disadvantages.

EP-A-186081 proposes using metal plates coated with hotmelt adhesives based on thermoplastic copolymers for bodywork repairs. The plates thus coated are then bonded over the damaged area. However, this process can only be used for metal parts and not for plastic moldings because, in this case, the area to be repaired has to be preheated to temperatures at which the hotmelt adhesive based on thermoplastic block copolymers softens, i.e. it has to be heated to temperatures above 100° C. Many plastic moldings, particularly those based on thermoplastic materials, lose their dimensional stability and their mechanical properties at temperatures as high as these, so that the process proposed in EP-A-186081 is not suitable for repairing plastic moldings.

EP-A-315101 describes a method for repairing damaged articles of composite materials. According to this document, the damaged area of the composite material is mended by bonding metal or pieces of cured composite material to the surface surrounding the damaged area. The adhesive used is a rubber-modified vinyl ester resin composition. In another embodiment, an uncured reinforcing material is impregnated with a rubber-modified vinyl ester resin composition, placed over the prepared damaged zone and cured there. Graphite fiber cloths and glass fiber cloths are proposed as the reinforcing material. According to EP-A-315101, the metal or composite material is applied to the entire damaged area. There is nothing to indicate whether this repair process is also suitable for repairing plastic moldings of thermoplastic materials.

The damaged areas of plastic moldings, particularly fenders of automobiles, very often develop relatively long cracks which drastically reduce the mechanical strength of the molding. Efforts to repair such damage in the conventional way by applying reinforcing metal parts or glass fiber cloths to the entire damaged area with an adhesive have shown that the mechanical properties of the molding thus repaired are considerably poorer than those of the original undamaged molding. Where metal patches are applied to the entire damaged area, it has been found, for example in the pendulum impact test, that the bond splits over a large area. In repairs carried out with glass fiber mats, the adhesive bond begins to tear and distort the molding at the original crack in tensile tests. In pendulum impact tests, too, the fiber cloth tears at the original crack. Accordingly, there is a need to develop a process which would enable damaged plastic moldings, particularly those used in the automotive industry, to be repaired with simple means. In addition, the process would ensure that not only would the repaired part be satisfactory in appearance, it would also be equivalent to the new part in its mechanical properties.

DETAILED DESCRIPTION OF THE INVENTION

It has now been found that a combination of narrow metal strips as reinforcing material and a one- or two-component adhesive enables plastic moldings to be repaired in such a way that they are restored to their original mechanical performance properties.

Accordingly, the present invention relates to a process for joining plastic moldings using a one-component or two-component adhesive, the connecting joint being spanned by at least one metal strip and the metal strip(s) being at least partly embedded in the adhesive layer.

The present invention also relates to an adhesive bond established between plastic moldings using a one-component or two-component adhesive, the connecting joint being spanned by at least one metal strip and the metal strip(s) being at least partly embedded in the adhesive layer.

This repair process may be applied to any moldings of plastics of the type used, for example, in the automotive industry, namely rubber-modified polyolefins, more particularly EPDM-modified polyethylene and/or polypropylene, polycarbonate, ABS, polyamide, polyurethane and fiber-reinforced plastics such as, for example, SMC or BMC.

Suitable adhesives for the repair process according to the invention are any one-component or two-component structural adhesives providing they cure at a sufficient rate at temperatures ranging from room temperature to at most 90° C. Examples of such adhesives are one-component or two-component epoxy adhesives, unsaturated polyesters in combination with styrene and/or methacrylates, (meth)acrylate adhesives and, in particular, two-component polyurethane adhesives.

To guarantee a durable high-strength bond, it is generally best to precoat the plastic molding with an adhesion-promoting primer, for example based on chlorinated polyolefin.

The reinforcing metal strips may consist of spring steel, aluminium and, in a particularly preferred embodiment, of electrolytically galvanized steel plate of the type used, for example, in body assembly. In addition to or instead of being galvanized, the metal strips may be surface-pretreated by other conventional methods including, for example, coating with so-called primers, electrodeposition painting, phosphating and/or lacquering.

The dimensions and the number of metal strips to be used per repair may vary within wide limits and are determined by the size of the area to be repaired and by the strengths which the bond is expected to develop. The thickness of the metal strips may vary between 0.2 and 1.5 mm and preferably between 0.2 and 1.0 mm, the plate thicknesses of 0.6 to 0.9 mm used in the automotive industry being most particularly preferred. The length and width of the metal strips are governed by the thickness of the joint to be spanned, their length varying between 30 and 200 mm and their width varying between 5 and 20 mm. In one particular embodiment, the metal strips are between 60 and 90 mm long and are 10 mm wide. In the repair of crack damage, at least one metal strip is bonded to the beginning of the crack although, in a preferred embodiment, metal strips are embedded in the adhesive layer on the back of the damaged molding at substantially regular intervals over the entire length of the crack. In another embodiment of the adhesive bond according to the invention, a combination of metal strips and fiber mats is used as the reinforcing material, at least one metal strip having to be bonded to the beginning of the crack. Although the metal strips can also be adapted to the shape of the plastic molding to be repaired, it can be of advantage to combine them with glass fiber mats or textile cloths where the damaged area to be repaired is complicated in shape or where parts of the repair work to be reinforced are visible so that very smooth bonding is necessary.

Curing of the bond may optionally be accelerated by heating to temperatures of up to 90° C. and preferably to temperatures of up to about 70° C., so that the bonded part can be further treated, for example sanded and painted, after a very short time. The heating process may be carried out with any known heat sources, more particularly hot air blowers or infrared heaters.

The bonding of moldings in accordance with the present invention is also extremely favorable from the environmental point of view because the correspondingly bonded moldings of thermoplastics remain fully recyclable.

During size reduction, for example in a shredder, and subsequent granulation, the cured adhesive residues do not affect the reuse of the plastic granules while the metal parts, particularly steel parts, can be removed from the granules by conventional methods of separation including, for example, electromagnetic separation or air separation.

EXAMPLES

The invention is illustrated by the following examples:

To simulate a crack, two 26×60×5 mm test specimens of EPDM-modified polypropylene were roughened with sandpaper over the surface to be bonded and coated with a primer based on a modified chlorinated polypropylene (Terokal 150, a product of Teroson). The two test specimens are then placed end-to-end along their short edges and the surface to be bonded is coated with a strand of a two-component polyurethane adhesive (Terokal 9225, a product of Teroson). Metal strips were then placed in the adhesive layer and pressed in gently with the fingers. After three days at room temperature, the bond was subjected to a pendulum impact test in accordance with DIN 51222. The results are set out in the following Table.

Tests According to the Invention

| Metal Strip | Dimensions [mm] | Impact Energy [units] | Evaluation |
| --- | --- | --- | --- |
| Spring steel, hardened 0.4 mm | 100 × 25 | 14.8 | O.K. |
| Spring steel, hardened 0.3 mm | 100 × 25 | 13.6 | O.K. |
| Spring steel, hardened 0.2 mm | 100 × 25 | 14.5 | O.K. |
| Spring steel, hardened 0.4 mm | 100 × 12.5 | 13.5 | O.K. |
| Spring steel, hardened 0.3 mm | 100 × 12.5 | 13.9 | O.K. |
| Spring steel, hardened 0.2 mm | 100 × 12.5 | 14.1 | O.K. |
| Electrolytically galvanized steel, 0.7 mm | 80 × 12.5 | 13.8 | O.K. |
| Electrolytically galvanized steel, 0.7 mm | (80 × 12.5) × 2 | 14.0 | O.K. |
| Electrolytically galvanized steel, 0.7 mm | 80 × 8 | 13.6 | O.K. |
| Electrolytically galvanized steel, 0.7 mm | (80 × 8) × 2 | 14.5 | O.K. |

Comparison Test

| Material | Dimensions [mm] | Impact Energy | Evaluation |
| --- | --- | --- | --- |
| Glass fiber mat | 100 × 25 | Material failure | Not O.K. |
| Glass fibet mat | 80 × 25 | Material failure | Not O.K. |
| Glass fiber mat | 60 × 25 | Material failure | Not O.K. |
| Glass fiber mat | 80 × 12.5 | Material failure | Not O.K. |
| Glass fiber mat | 80 × 8 | Material failure | Not O.K. |

Legend to the Table:
O.K.: bond intact
Material failure in the glass fiber mat
Not O.K.: bond not intact.
In the pendulum impact tests, a load of 15 Kp was applied to the pendulum.

Practical tests:

In a practical test, a damaged fender of EPDM-modified polyethylene which had a crack 670 mm long was bonded in accordance with the invention using 16 strips of electrolytically galvanized steel plate each measuring 40×25 mm and was subjected to a crash test in compliance with Opel specifications. The fender entirely fulfilled the manufacturer's specifications, i.e. it came through the crash test undamaged.

Comparison tests:

A fender of the same type with the same crack shape and dimensions was bonded using a glass fiber mat. It failed the crash test, cracking again at the site of the original damage.

A fender of the same type with the same crack shape and dimensions was bonded with a single 40×150 mm steel plate. The bond actually failed in the preparations for the crash test on account of the slight distortion of the molding. It is clearly apparent from the tests described above that only the bonds according to the invention ensure full serviceability of the bonded moldings.

What is claimed is:

1. A process for repairing a damaged plastic molding using the adhesive and metal strips as reinforcing material comprising the steps of:

applying an adhesive layer to said plastic molding wherein said adhesive layer is selected from the group consisting of one-component epoxy adhesives, two-component epoxy adhesives, one-component polyurethane adhesives, two component polyurethane adhesives, one-component unsaturated polyesters, two-component unsaturated polyesters, one-component acrylate adhesives, two-component acrylate adhesives, one-component methacrylate adhesives, two component methacrylate adhesives and mixtures thereof;

embedding a plurality of metal strips in said adhesive layer at substantially regular intervals over the entire length of the damaged area; and bonding the adhesive layer and said metal strips to the surfaces to be repaired.

2. A process as claimed in claim 1, wherein said metal strips are selected from the group consisting of electrolytically galvanized steel plate, electrolytically galvanized and primed steel plate, electrolytically galvanized and painted steel plate, electrolytically galvanized primed and painted steel plate, primed steel plate, painted steel plate, primed and painted steel plate.

3. A process as claimed in claim 1, wherein said metal strips are about 30 to about 200 mm long, about 5 to about 20 mm wide and about 0.2 to about 1.0 mm thick.

4. A process as claimed in claim 1, further comprising the step of coating over the plastic molding surfaces to be bonded with an adhesion-promoting primer.

5. A process as claimed in claim 1, wherein the bonding step further comprises heating to a temperature of about 30° C. to about 90° C.

6. A repaired plastic molding produced by the process claimed in claim 1.

* * * * *